United States Patent Office 3,706,759
Patented Dec. 19, 1972

3,706,759
ANTHELMINTIC THIOCYANATOBENZO-
THIAZOLES
Robert J. Alaimo and Stanford S. Pelosi, Jr., Norwich,
N.Y., assignors to Morton-Norwich Products, Inc.
No Drawing. Filed Oct. 28, 1970, Ser. No. 84,952
Int. Cl. C07d 91/46
U.S. Cl. 260—305  3 Claims

ABSTRACT OF THE DISCLOSURE

Certain thiocyanatobenzothiazoles of the formula:

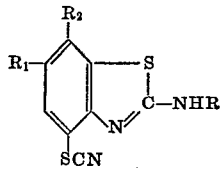

wherein R is hydrogen or acetyl; $R_1$ is ethyl, fluoro or chloro; and $R_2$ is hydrogen, methyl or chloro are effective anthelmintic agents.

---

This invention relates to chemical compounds. More particularly this invention relates to certain thiocyanatobenzothiazoles of the formula:

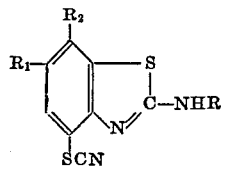

wherein R is hydrogen or acetyl; $R_1$ is ethyl, fluoro or chloro; and $R_2$ is hydrogen, methyl or chloro and a method for their preparation.

These compounds are distinguished by their ability to combat helminth infection. When administered by gavage as a suspension in aqueous solution to mice harboring *Ascaris suum* or *Hymenolepis nana* worms, these compounds, in a dose ranging from 25–300 mg./kg., accomplish a 68–100% reduction of the worm burden.

The compounds of this invention are readily prepared. Currently it is preferred to react the appropriate aniline with an alkali thiocyanate, such as sodium, in the presence of bromine in an alkanol carrier saturated with sodium bromide. Acylation is accomplished in conventional fashion with acetic anhydride or acetyl chloride.

The compounds of this invention can be combined in obvious forms such as suspensions and dispersions to provide conveniently administered dosage compositions.

In order that this invention may be fully available to and understood by those skilled in the art, the following examples are supplied.

EXAMPLE I 2-amino-6-ethyl-4-thiocyanatobenzothiazole

To methanol (1500 ml.) was added sodium thiocyanate (400 g., 5.0 moles) and the mixture was chilled in an ice-salt bath to —7°. To the stirred mixture was added dropwise a mixture of bromine (80 ml., 1.5 moles) in sodium bromide saturated methanol (200 ml.). After addition was ¾ complete, p-ethylaniline (120 g., 1.0 mole) in methanol (50 ml.) was added in one portion along with the remaining bromine mixture. The mixture was stirred at room temperature for 5 hours, then filtered. The filtrate was poured into water (3 l.) and neutralized with $NH_4OH$. The product was removed by filtration, washed with water and dried. The product weighed 125 g. (53%).

Recrystallization from methanol (Darco) provided an analytical sample as cream colored crystals which melted at 191–192°.

Analysis.—Calcd. for $C_{10}H_9N_3S_2$ (percent): C, 51.03; H, 3.85; N, 17.86. Found (percent): C, 51.26; H, 3.93; N, 17.82.

EXAMPLE II (A) 2-amino-6,7-dichloro-4-thiocyanatobenzothiazole

To 800 ml. of methanol was added sodium thiocyanate (162 g., 2.0 moles). The mixture was stirred below —15° in a Dry Ice-acetone bath. To it was added a cooled solution of bromine (60 ml., 1.0 mole) in sodium bromide saturated methanol (400 ml.) over 5 to 10 minutes maintaining temperature below —10° and shielding from light. After all was added, 65 g. (0.4 mole) of 3,4-dichloroaniline is added, stirring rapidly below —10 to —15° and allowing to slowly come to room temperature; then stirring slowly for 5 to 6 hours. After total stirring of 6 to 7 hours, the mixture was filtered and the solid suspended in water, stirred and made basic with $NH_4OH$. The solid was filtered, washed with $H_2O$, air-dried, then put in about 1 liter of alcohol and boiled under stirring and filtered into warm flask. Crystallization took place on cooling, yielding 22 g. Upon recrystallization from alcohol a white crystalline solid was obtained which melted at 243 to 245°.

Analysis.—Calcd. for $C_8H_3Cl_2N_3S_2$ (percent): C, 34.79; H, 1.10; N, 15.21. Found (percent): C, 34.61; H, 1.05; N, 15.02.

(B) 2-acetamido-6,7-dichloro-4-thiocyanatobenzothiazole

Acetyl chloride (8.5 ml., 0.12 mole) was added dropwise to a stirred mixture of 27 g. (0.10 mole) of (A) and 20 g. (0.25 mole) of anhydrous sodium acetate in 150 ml. of dimethylformamide at room temperature with a temperature rise to 45°. The mixture was heated on a steam bath for 2 hr., cooled and poured into an ice-water mixture. The solid was collected by filtration and was recrystallized from a dimethylformamide-$H_2O$ mixture to give 23 g. (72%), M.P. 285–287°.

Analysis.—Calcd. for $C_{10}H_5Cl_2N_3OS_2$ (percent): C, 37.74; H, 1.58; N, 13.21. Found (percent): C, 37.59, 37.75; H, 1.76, 1.80; N, 12.75, 12.80.

EXAMPLE III 2-amino-6-fluoro-7-methyl-4-thiocyanatobenzothiazole

A cold solution of 36 ml. (0.60 mole) of bromine in 250 ml. of absolute methanol saturated with sodium bromide was added dropwise to a stirred mixture of 97 g. (1.20 moles) of sodium thiocyanate and 500 ml. of methanol at —20 to —15°. 4-fluoro-3-methylaniline (25 g., 0.20 mole) was added in portions to the mixture at —15 to —10°. Stirring was continued at —15 to —10° for 1½ hours, and the Dry Ice-acetone bath was removed. After stirring at room temperature overnight, the mixture was filtered. The solid was suspended in water, made basic with $NH_4OH$, and collected by filtration. The solid was heated in 700 ml. of ethanol and filtered hot to remove insoluble material. The filtrate was cooled in ice, and the solid which was deposited was collected by filtration to give 10 g. (21%). Recrystallization from ethanol and methanol gave a M.P. of 224–226°.

*Analysis.*—Calcd. for $C_9H_6FN_3S_2$ (percent): C, 45.17; H, 2.53; N, 17.56. Found (percent): C, 45.46; H, 2.53; N, 17.59.

What is claimed is:
1. A compound of the formula:

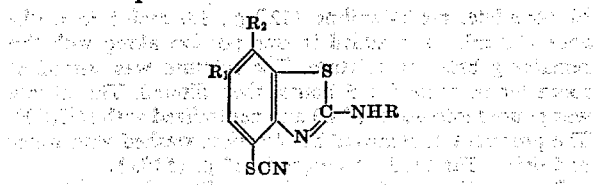

wherein when R is hydrogen, $R_1$ and $R_2$ are, respectively, fluoro and methyl; and when R is acetyl, $R_1$ and $R_2$ are chloro.

2. The compound of claim 1 wherein R is acetyl; $R_1$ is chloro; and $R_2$ is chloro.

3. The compound of claim 1 wherein R is hydrogen; $R_1$ is fluoro; and $R_2$ is methyl.

References Cited

Fishwick et al.: Chem. Abstracts, 55:14925f (1961).
Likhosherstov et al.: Chem. Abstracts, 28:2690–1 (1934).
Elderfield: Heterocyclic Compounds, vol. 5, pp. 585–6, New York, Wiley, 1957.

ALTON D. ROLLINS, Primary Examiner
R. J. GALLAGHER, Assistant Examiner

U.S. Cl. X.R.
260—999